United States Patent [19]

Inoue

[11] Patent Number: 5,468,385
[45] Date of Patent: Nov. 21, 1995

[54] CHARGED COALESCER TYPE OIL-WATER SEPARATING APPARATUS

[76] Inventor: Noboru Inoue, 727 Funaki-cho, Ono-shi, Hyogo 675-13, Japan

[21] Appl. No.: 318,101

[22] Filed: Oct. 5, 1994

[30] Foreign Application Priority Data

Oct. 7, 1993 [JP] Japan .................... 5-251420

[51] Int. Cl.$^6$ .................... B01D 17/06
[52] U.S. Cl. .................... 210/243; 210/305; 210/307; 210/540; 210/DIG. 5; 210/748; 204/151; 204/152; 204/302
[58] Field of Search .................... 204/188, 302, 204/272, 149, 151, 152; 210/243, 305, 307, 338, 521, 538, 540, 489, 748, DIG. 5

[56] References Cited

U.S. PATENT DOCUMENTS

| | | | |
|---|---|---|---|
| 2,651,414 | 9/1953 | Lawson | 210/DIG. 5 |
| 3,764,499 | 10/1973 | Okubo et al. | 204/151 |
| 3,859,195 | 1/1975 | Williams | 204/151 |
| 3,876,594 | 4/1975 | Fowler | 210/DIG. 5 |
| 4,013,554 | 3/1977 | Reis | 204/149 |
| 4,159,235 | 6/1979 | Kammel et al. | 204/152 |
| 4,309,289 | 1/1982 | Head | 210/DIG. 5 |
| 4,426,261 | 1/1984 | Fushihara | 204/151 |
| 5,244,550 | 9/1993 | Inoue | 204/302 |

FOREIGN PATENT DOCUMENTS

| | | |
|---|---|---|
| 377603 | 4/1981 | Japan . |
| 58-95507 | 6/1983 | Japan . |
| 59-42014 | 3/1984 | Japan . |
| 62-216616 | 9/1987 | Japan . |

Primary Examiner—Christopher Upton
Attorney, Agent, or Firm—Armstrong, Westerman, Hattori, McLeland and Naughton

[57] ABSTRACT

An electric field is applied to a coalescer type filter element in which the mesh size decreases in a step-like manner toward its outside. A subject liquid is passed through the filter from its inside to outside. A primary processed liquid discharged from the filter is introduced into an oil-water separating space provided outside the filter which space has an elongated path and to which space an electric field is applied. While the primary processed liquid passes through the oil-water separating space, rise of separated oil and fall of separated water are facilitated.

1 Claim, 3 Drawing Sheets

FIG. 3
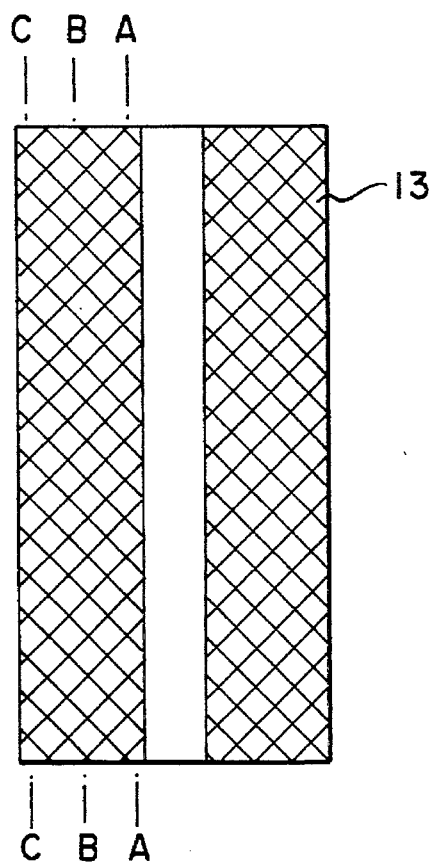
FIG.4(a)  FIG.4(b)  FIG.4(c)
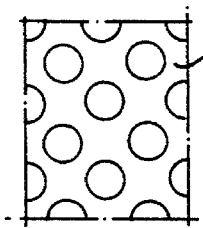
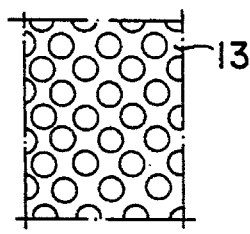
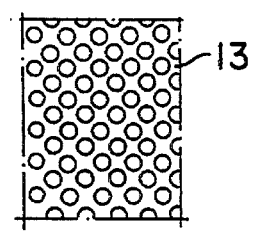

CHARGED COALESCER TYPE OIL-WATER SEPARATING APPARATUS

BACKGROUND OF THE INVENTION

The present invention relates to a charged coalescer type oil-type water separating apparatus which efficiently separates water from water-containing oil or oil from oil-containing water to enable their recycling and which contributes to not only saving of resources and energy but also cleaning of the earth environment by reducing waste oil and liquids.

To prevent the earth environment from being polluted, strict regulations on the release of waste oil and liquids to the natural environment have been established in recent years. These regulations require to reduce the total amount of waste oil and liquids and, therefore, it is an urgent subject to separate and collect water and oil from water-containing oil and oil-containing water. The separation and collection of water and oil from water-containing oil and oil-containing water is also required for the purpose of saving resources and energy, which is another important issue.

Among oil-water separating apparatuses, a coalescer type apparatus is well known. The coalescer type oil-water separating apparatus uses a coalescer type filter element in which filtering materials are different in mesh size and are layered such that meshes become finer in a step-like manner toward the downstream side in the fluid passing direction. The most general form of this type of oil-water separating apparatus is as follows. A cylindrical coalescer type filter element is disposed at the center of a container, and a pressurized liquid to be processed is introduced into the container from the outside and passed through the filter element from its outside to inside. While the liquid is passed through the filter element oil particles are interrupted by meshes that become finer in a step-like manner in the liquid passing direction, and caused to go up. Water thus separated is extracted from the axial portion of the filter element.

Another oil-water separating apparatus is known which was proposed in Japanese Patent Application No. Hei. 1-213168 entitled "Two Liquid Separating Methods and Apparatuses for Implementing them" filed by the present applicant. This apparatus has the following configuration. A single layer cylindrical filter element having meshes of an uniform size over the entire area is disposed at the center of a cylindrical container also serving as an outer cylinder grounding electrode. A central cylinder electrode having the same potential as the outer cylinder grounding electrode is placed at the axial position of the filter element. On the other hand, a cylindrical charge electrode made of a perforated metal plate is disposed outside the filter element so as to contact with its outer surface, and a voltage that can lower or eliminate the zeta potential of impurity particles in a liquid being processed is applied between the cylindrical charge electrode and the outer cylinder grounding electrode and between the cylindrical charge electrode and the central cylinder electrode. In this apparatus, a pressurized liquid to be processed that has been introduced into the container from the outside is first passed through an oil-water separating space formed between the cylindrical charge electrode and the outer cylinder grounding electrode in which space oil particles cohere due to the charge effect and oil goes up. i.e., separated, due to the difference in specific gravity. Then the separated water is passed through the filter element from its outer surface to its axial portion, and a filtered liquid is discharged from the filter axial portion.

However, each of the above two apparatuses still has problems to be solved.

The oil-water separating apparatus using the coalescer type filter element, in which the oil-water separation relies on only the physical operation, i.e., the interruption of oil particles by meshes of the filter, has a limitation in the size of separable oil particles. For example, where oil is in the form of emulsion, filter meshes need to have a very small size of less than 1 micron. Since such a filter tends to clog up early due to inclusion of dust or oil having a high viscosity, the filter element needs to be replaced at a high frequency. That is, in the conventional coalescer type oil-water separating apparatus, the running cost inevitably increases to obtain a higher accuracy.

In the two liquids separating apparatus proposed in the Japanese patent application of the present applicant, a liquid to be processed is placed in an electric field. Therefore, impurity particles and oil particles are caused to cohere to become coarser due to the charge cohesion effect, to thereby provide the filtering effect and the oil-water separating effect which are superior to those of the coalescer type oil-water separating apparatus. However, since meshes of the filter have a uniform size over the entire area, the apparatus of the present applicant cannot provide an improvement in the effect that impurity particles and oil particles cohere to become coarser due to a step-like profile of mesh sizes, as is expected in the coalescer type filter element.

Further, in the latter apparatus, a liquid to be processed is first subjected to oil-water separation, only the separated water is then filtered by being passed through the filter from its outer surface to its inside, and finally the filtered separated water is discharged from the filter axial portion. Therefore, dust and the like are not eliminated from the separated oil. To reuse the oil thus separated and collected, it is necessary to install a separate filtering device outside the oil-water separating apparatus.

SUMMARY OF THE INVENTION

The present invention has been made in view of the above circumstances, and has an object of providing a charged coalescer type oil-water separating apparatus which not only can separate, by a single-unit apparatus with high accuracy, oil and water from such subject liquids as a mixture of oil and water in the form of emulsion that are hardly separated by the conventional apparatuses, but also enables reuse of both water and oil that are separated and collected.

To solve the above problems, the present inventor has eagerly investigated and reached the following two conceptions.

1) Use a cylindrical, coalescer type filter element in which the mesh size decreases in a step-like manner toward the outside in its radial direction, and place the filter element in an electric field.

2) Pass a subject liquid through a cylindrical filter element from its axial portion to its outer surface; that is, cause the subject liquid to flow outward.

The present invention, which has been made based on the above conceptions, has the following constitution.

A charged coalescer type oil-water separating apparatus comprises:
an outer cylinder grounding electrode also serving as a main body container;
a central cylinder electrode provided inside the outer cylinder grounding electrode, given the same potential as the outer cylinder grounding electrode, and having a plurality of liquid passing holes and one open end serving as an inlet of a pressurized subject liquid;

a cylindrical, coalescer type filter element detachably interposed between the outer cylinder grounding electrode and the central cylinder electrode, a mesh size of the filter element decreasing in a step-like manner toward an outside of the filter element in its radial direction, an cylindrical surface of the filter element being in contact with or in close proximity to the central cylinder electrode;

an oil-water separating space provided between the filter element and the outer cylinder grounding electrode, a top portion and a bottom portion of the oil-water separating space serving as a separated oil accumulation space communicated with a separated oil outlet and as a separated water accumulation space communicated with a separated water outlet, respectively:

a cylindrical charge electrode made of a perforated metal plate or a mesh-like metal body and disposed outside the filter element so as to be in contact with or in close proximity to an outer cylindrical surface of the filter element; and a bypass cylinder electrode disposed in the oil-water separating space so as to be concentric with the outer cylinder grounding electrode, for elongating a liquid passing path, wherein a voltage large enough to lower or eliminate a zeta potential of impurity particles in the subject liquid is applied between the outer cylinder grounding electrode and the cylindrical charge electrode and between the central cylinder electrode and the cylindrical charge electrode; and wherein the pressurized subject liquid is introduced by a pump from an outside of the container into an internal space of the central cylinder electrode, and passed through the filter element from its inside to outside to produce a primary processed liquid that has been subjected to filtration and preliminary cohesion, which primary processed liquid is introduced into the oil-water separating space, where separated oil and water are accumulated in the respective accumulation spaces during a process that the primary processed liquid flows upward and downward, and the accumulated separated oil and water are finally discharged from the container.

The charged coalescer type oil-water separating apparatus having the above constitution operates in the following manner.

First, a pressurized subject I quid is introduced by a pump or the like through the one open end of the central cylinder electrode. The pressurized subject liquid introduced into the central cylinder electrode enters the coalescer type filter element through the liquid passing holes and the inner surface of the filter element, passes through the filter toward its outer surface, and goes out of the filter through the holes of the cylindrical charge electrode disposed outside the filter surface.

While the subject liquid passes through filter fine holes whose sizes decrease in a step-like manner toward the downstream side in the subject liquid passing direction, oil and water are separated from each other by emulsion breaking and, at the same time, impurity particles such as dust are removed from the subject liquid. Thus, a primary processed liquid is discharged from the filter. In the filter, there occur at the same time the physical filtering operation by the meshes and the charge-induced phenomenon that particles cohere to become coarser (preliminary cohesion). This phenomenon is caused by neutralization of the boundary potential (zeta potential) of oil particles or water molecules by the electric field. Oil particles or water molecules are combined together by an intermolecular force, i.e., cohere to become coarser.

The primary processed liquid discharged outside of the filter is introduced into the oil-water separating space formed between the filter and the outer cylinder grounding electrode, to which the electric field is applied and in which the bypass cylinder electrode is disposed to elongate the liquid passing path. The primary processed liquid is already in such a state that impurity particles have been removed and oil particles and water molecules have been separated from each other. While the primary processed liquid passes through the oil-water separating space, oil particles and water molecules further cohere to become coarser under the influence of the electric field. Then, oil goes up due to the difference in specific gravity to be accumulated in the separated oil accumulation space, and is discharged outside of the container through the separated oil outlet. On the other hand, water goes down to be accumulated in the separated water accumulation space, and is discharged outside of the container through the separated water outlet. Since the separated oil and water thus collected are clean, they are suitable for recycling.

BRIEF DESCRIPTION OF THE DRAWINGS

FIG. 3 is a longitudinal sectional view of a coalescer type filter element;

FIGS. 4(a)–4(c) are enlarged views schematically showing mesh sizes at respective positions of the coalescer type filter element of FIG. 3;

DESCRIPTION OF THE PREFERRED EMBODIMENTS

Figure 1:
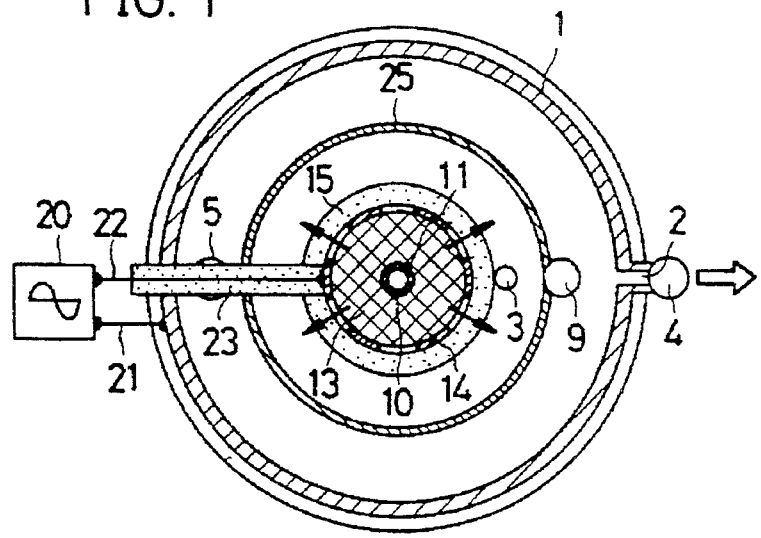
FIG. 1 is a transverse sectional view of an embodiment of a charged coalescer type oil-water separating apparatus directed to oil-containing water.
Figure 2:
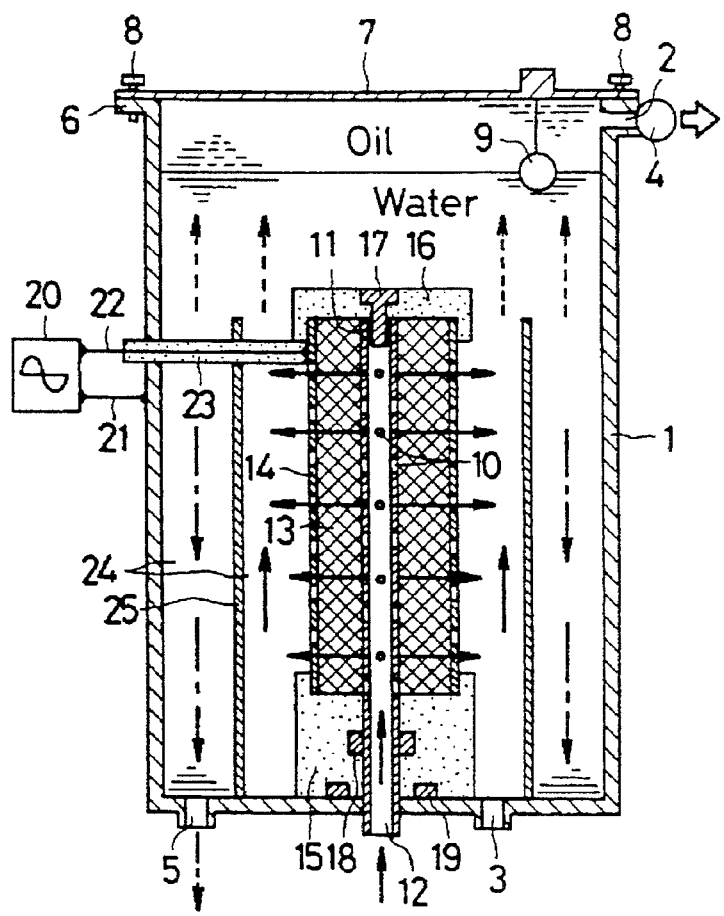
FIG. 2 is a longitudinal sectional view of the embodiment of FIG. 1.
Figure 5:
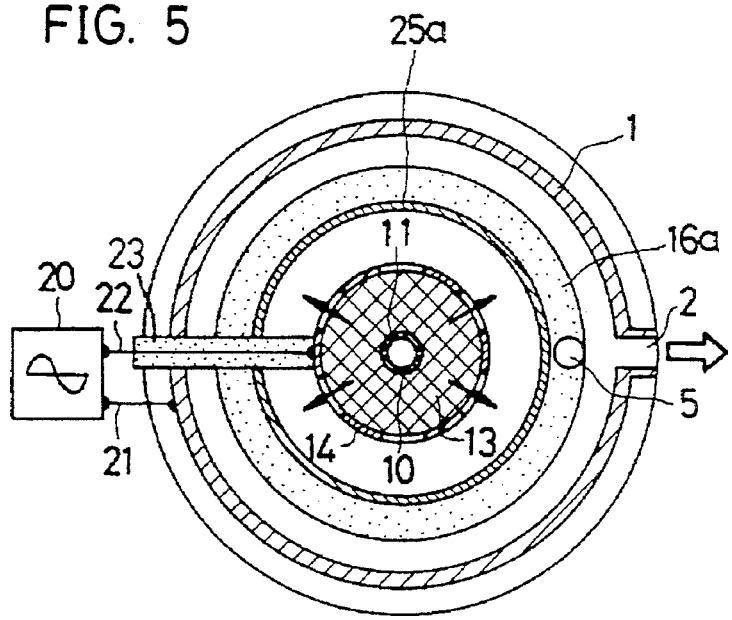
FIG. 5 is a transverse sectional view of an embodiment of a charged coalescer type oil-water separating apparatus directed to water-containing oil.
Figure 6:
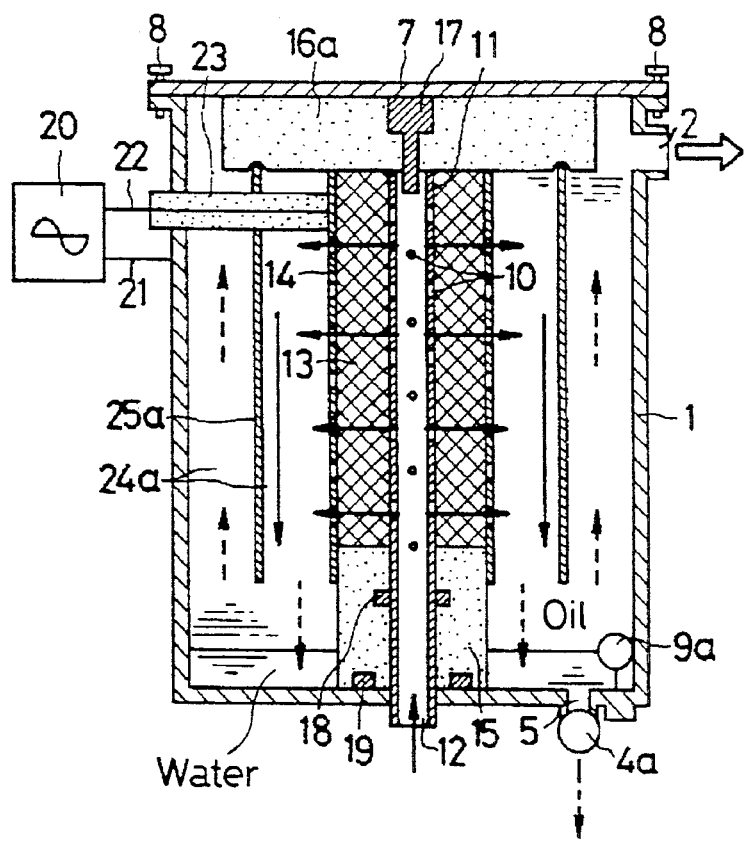
FIG. 6 is a longitudinal sectional view of the embodiment of FIG. 5.

Details of the present invention will be hereinafter described by way of illustrated embodiments. An apparatus shown in FIGS. 1 and 2 is directed to a subject liquid that is water containing a small amount of oil (hereinafter called oil-containing water). On the other hand, an apparatus shown in FIGS. 5 and 6 is directed to a subject liquid that is oil containing a small amount of water (hereinafter called water-containing oil). First, the apparatus directed to oil-containing water will be described.

In FIGS. 1 and 2, reference numeral 1 denotes an outer cylinder grounding electrode also serving as a main body container, which is a cylinder having an open top and a closed bottom. Its side wall is formed with, at an upper position, a separated oil outlet 2 that is equipped with an electromagnetic valve 4. On the other hand, the bottom plate is formed with a drain 3 for discharging dust, sludge, etc. deposited in the container when necessary. Further, the bottom plate is formed with a separated water outlet 5 at a peripheral position.

The outer cylinder grounding electrode 1 is further formed with a flange 6 around the top edge. The top opening of the outer cylinder grounding electrode 1 is covered with a lid 7, which is fixed to the flange 6 with bolts 8 that penetrate through the flange 6. An oil-water boundary detecting sensor 9 is suspended from the lid 7 toward the inside of the container.

A central cylinder electrode 11 having a plurality of liquid passing holes 10 in its cylindrical wall and given the same potential as the outer cylinder grounding electrode 1 is disposed at the center (in the radial direction) of the outer cylinder grounding electrode 1. The bottom end of the central cylinder electrode 11 penetrates through the bottom plate of the outer cylinder grounding electrode 1 so as to project outside of the container, and the open bottom end of the projecting portion serves as an inlet 12 of a pressurized subject liquid.

A coalescer type filter element 13 (hereinafter simply called a filter 13) is disposed outside the central cylinder electrode 11 such that the inner surface of the filter element 13 is in close proximity to or in contact with the central cylinder electrode 11.

Referring to FIG. 3 and FIGS. 4(a)–4(c), the filter 13 is a layered body made of paper or fiber in which the mesh size decreases in a step-like manner from the inside to outside in the radial direction. While non-conductive materials are generally used as the filter material, conductive materials such as active carbon and carbon fiber may be used to improve the charge effect of the filter 13. Since this embodiment is directed to oil-containing water, an oil repellent material is used as the filter material so that oil hardly remains in the filter.

A cylindrical charge electrode 14 made of a perforated metal plate or a mesh-like metal body is disposed outside the cylindrical surface of the filter 13 so as to contact with it. A predetermined voltage is applied between the cylindrical charge electrode 14 and the outer cylinder grounding electrode 1 and between the cylindrical charge electrode 14 and the central cylinder electrode 11.

The filter 13 is detachable, and is fixed to a predetermined place in the container by being held between a filter receiving insulator 15 and a filter pressing insulator 16. In the FIGURES, reference numeral 17 denotes a filter fastening screw, and 18 and represent O-rings for sealing.

For charging of the cylindrical charge electrode 14, a grounding line 21 led from a power supply 20 that is installed outside the container is connected to the outer cylinder grounding electrode 1, and a charge line 22 that is inserted into an insulator 23 penetrating through the outer cylinder grounding electrode 1 is connected to the cylindrical charge electrode 14.

The application voltage is selected so as to be able to lower or eliminate tile zeta potential of impurity particles contained in a liquid. This voltage is selected in accordance with the kind of subject liquid. In general, the voltage is set lower when the subject liquid is a water soluble one such as oil-containing water, because it is low in insulation performance. Further, a DC voltage is not employed to avoid electrolytic corrosion. On the other hand, the voltage is set higher when the subject liquid is not a water soluble one such as water-containing oil, because it is high in insulation performance. In this embodiment, which is directed to oil-containing water, an AC voltage of 0.5 to 30 V/cm or an AC voltage having a high-frequency component is employed.

An oil-water separating space 24 is formed between the cylindrical charge electrode 14 and the outer cylinder grounding electrode 1. A bypass cylinder electrode 25 is erected from the bottom plate of the outer cylinder grounding electrode 1 at an intermediate position in the radial direction in the oil-water separating space 24 so that the top end is spaced from the lid 7. The bypass cylinder electrode 25 serves to elongate the path length of a liquid that passes through the oil-water separating space 24. More specifically, the space inside the bypass cylinder electrode 25 is an ascending space and the space outside the electrode 25 is a descending space. Although the illustrated bypass cylinder electrode 25 completely prevents a liquid from passing through it, its upper half may be replaced by a perforated plate to control the amount of passing liquid.

The upper portion of the inside space of the main body container is made a separated oil accumulation space that communicates with the separated oil outlet 2. On the other hand, the lower portion of the inside space serves as a separated water accumulation space that communicates with the separated water outlet 5.

The charged coalescer type oil-water separating apparatus having the above configuration operates in the following manner. As indicated by solid arrows in the FIGURES, a pressurized subject liquid is introduced by a pump from the outside of the container to the internal space of the central cylinder electrode 11. Then, the liquid is passed through the filter 18 from its inside to outside to simultaneously effect filtration and preliminary cohesion, to thereby produce a primary processed liquid, which enters the oil-water separating space 24. The primary processed liquid first flows upward and then downward in the oil-water separating space 24, in which process oil particles further cohere to become coarser. During this process, while separated oil goes up as indicated by dashed arrows in FIG. 2, and separated water goes down as indicated by chain lines. The separated oil and water are collected through the separated oil outlet 2 and the separated water outlet 5.

While the subject liquid passes through the filter 13 under an electric field. i.e., passes through its fine holes whose sizes decrease in a step-like manner toward the downstream side in the subject liquid passing direction, oil and water are separated from each other by emulsion breaking and, at the same time, impurity particles such as dust are removed from the subject liquid. In the filter 13, there occur at the same time the physical filtering operation by the meshes and the charge-induced phenomenon that particles cohere to become coarser.

The primary processed liquid discharged outside of the filter 13 is already in such a state that impurity particles have been removed and oil particles and water molecules have been separated from each other. While the primary processed liquid passes through the oil-water separating space 24 to which an electric field is applied, oil particles further cohere to become coarser under the influence of the electric field. Then, oil goes up due to the difference in specific gravity to be accumulated in the separated oil accumulation space, and is discharged outside of the container through the separated oil outlet 2. On the other hand, water goes down to be accumulated in the separated water accumulation space, and is discharged outside of the container through the separated water outlet 5. The accumulation amount of the separated oil is always monitored by the boundary detecting sensor 9. When the accumulation amount has reached a predetermined level, the electromagnetic valve 4 is opened to discharge the oil.

Since the separated oil and water thus collected are clean, they can be recycled.

FIGS. 5 and 6 show an oil-water separating apparatus directed to a subject liquid of water-containing oil. In this apparatus, a bypass cylinder electrode 25a is suspended downward with its top end contacted with a filter pressing insulator 16a that contacts with the lid 7. A gap is provided between the bottom end of the bypass cylinder electrode 25a and the bottom plate of the outer cylinder grounding electrode 1. An oil-water boundary detecting sensor 9a is erected from the bottom plate of the outer cylinder grounding electrode 1, and an electromagnetic valve 4a is attached to the separated water outlet 5. In this embodiment directed to water-containing oil, a water repellent filter material is used to prevent water from remaining in the filter.

In this embodiment directed to water-containing oil, an application of voltage is a DC or AC voltage of 0.5 to 200 V/cm, a DC voltage and an AC voltage superimposed on each other, or one of these types of voltages further having a high-frequency component.

In the apparatus of this embodiment, the inside of the container is mostly filled with oil, and separated water is accumulated in the bottom portion of the container. A primary processed liquid that has passed through the filter 13 from its inside to outside enters an oil-water separating space 24a, where the primary processed liquid first flows downward to facilitate fall and accumulation of separated water, and then flows upward to allow separated oil to go up.

The amount of water accumulated in the container bottom portion is always monitored by the boundary detecting sensor 9a. When the accumulation amount has reached a predetermined level, the electromagnetic valve is opened to discharge the water.

Next, a description will be made of results of a test that was conducted to confirm the effects of the invention. In this test, it was examined how the oil-water separating ability depends on application/non-application of electricity to the coalescer type filter element.

The test was conducted using the apparatus shown in FIGS. 1 and 2. A coalescer type filter element incorporated in the test apparatus had an outside diameter of 62 φ mm, an axial length of 125 mm, and a minimum mesh size ( on the outer surface side) of 2 μm. A liquid to be processed as a test subject was prepared such that warm water at 50° of 40 liters was mixed with rust preventive oil (known as hardest to be separated from water) of 0.8 liter (that is, the oil content was 2%), and a mixture was agitated and then emulsified. A pump for supplying the subject liquid to the test apparatus provided a flow rate of 2.5 liters/min. and the subject liquid of 40.8 liters took 16 minutes to pass, once, through the test apparatus, i.e., charged coalescer type oil-water separating apparatus. Under the above conditions, the subject liquid was supplied to the test apparatus, and subjected to oil-water separation. Separated water was returned to the test apparatus through a recycling path. It was measured how the oil content of the subject liquid in a tank of the test apparatus and the oil content at an outlet of the apparatus vary with the number of passages through the test apparatus, specifically, one passage, three passages and five passages. The electricity application to the coalescer type filter element was made such that an AC voltage of 25 V was applied between electrodes spaced by 2.5 cm (10 V/cm). Test results are shown in Table. In Table, the unit of the oil content is ppm.

TABLE

| | Sample taking location | Before processing | 1 passage | 3 passages | 5 passages |
| --- | --- | --- | --- | --- | --- |
| No electricity is applied to coalescer type | Within tank | 19240 | 4524 | 74 | 14 |
| | Apparatus | | 405 | 24 | 10 |

TABLE-continued

| | Sample taking location | Before processing | 1 passage | 3 passages | 5 passages |
| --- | --- | --- | --- | --- | --- |
| filter element AC 25 V is applied to coalescer type filter element | Within tank | 19240 | 3050 | 22 | 1 |
| | Apparatus outlet | | 50 | 4 | 0 |

As is apparent from the test results, it has been found that the oil-water separating ability is greatly improved when a voltage is applied to tile coalescer type filter element.

Although not shown in Table, an improvement was found in the effect of eliminating dust from the subject liquid.

According to the invention, an electric field is applied to the coalescer type filter element in which the mesh size decreases in a step-like manner toward the outside. Further, a subject liquid is passed through the filter from its inside to outside, and a primary processed liquid discharged from the filter is introduced into the oil-water separating space that is provided outside the cylindrical outer surface of the filter. While the primary processed liquid passes through the oil-water separating space which has a long path and to which an electric field is applied, rise of separated oil and fall of separated water are facilitated. As a result, the oil-water separation of such subject liquids as a mixture of oil and water in the form of emulsion, which is hardly performed by the conventional apparatuses, can be performed efficiently with high accuracy. Further, the separated oil and water discharged from the apparatus of the invention are clean and suitable for recycling, because they have been filtered. In addition, since the main part of the apparatus of the invention is accommodated, as a single unit, in a single container and all the processing is performed in the single container, the apparatus is compact and can be handled easily.

What is claimed is:

1. A charged coalescer type oil-water separating apparatus comprising:

an outer cylinder grounding electrode also serving as a main body container;

a central cylinder electrode provided inside the outer cylinder grounding electrode, given the same potential as the outer cylinder grounding electrode, and having a plurality of liquid passing holes and one open end serving as an inlet of a pressurized subject liquid;

a cylindrical, coalescer type filter element detachably interposed between the outer cylinder grounding electrode and the central cylinder electrode, a mesh size of the filter element decreasing in a step-like manner toward an outside of the filter element in its radial direction, an inner cylindrical surface of the filter element being in contact with or in close proximity to the central cylinder electrode;

an oil-water separating space provided between the filter element and the outer cylinder grounding electrode, a top portion and a bottom portion of the oil-water separating space serving as a separated oil accumulation space communicated with a separated oil outlet and as a separated water accumulation space communicated with a separated water outlet respectively;

a cylindrical charge electrode made of a perforated metal plate or a mesh-like metal body and disposed outside the filter element so as to be in contact with or in close proximity to an outer cylindrical surface of the filter element; and bypass cylinder electrode disposed in the oil-water separating space between the filter element and the separated water outlet so as to be concentric with the outer cylinder grounding electrode, for elongating a liquid passing path, means for applying a voltage large enough to lower or eliminate a zeta potential of impurity particles in the subject liquid between the outer cylinder grounding electrode and the cylindrical charge electrode and between the central cylinder electrode and the cylindrical charge electrode; and pump means for introducing a pressurized subject liquid from an outside of the container into an internal space of the central cylinder electrode, and passed through the filter element from its inside to outside to produce a primary processed liquid that has been subjected to filtration and preliminary cohesion, which primary processed liquid is introduced into the oil-water separating space, where separated oil and water are accumulated in the respective accumulation spaces during a process that the primary processed liquid flows upward and downward, and the accumulated separated oil and water are finally discharged from the container.

* * * * *